(12) United States Patent
Georghe

(10) Patent No.: US 11,718,114 B2
(45) Date of Patent: Aug. 8, 2023

(54) TEMPLATE EMBEDDED ASSEMBLY INSTRUCTIONS IN GARMENT ASSEMBLY

(71) Applicant: Resonance Companies LLC, New York, NY (US)

(72) Inventor: Christian Georghe, New York, NY (US)

(73) Assignee: Resonance Companies LLC, New York, NY (US)

( * ) Notice: Subject to any disclaimer, the term of this patent is extended or adjusted under 35 U.S.C. 154(b) by 846 days.

(21) Appl. No.: 16/702,867

(22) Filed: Dec. 4, 2019

(65) Prior Publication Data

US 2021/0170770 A1 Jun. 10, 2021

(51) Int. Cl.
*B41J 29/393* (2006.01)
*G05B 15/02* (2006.01)
*B41F 17/38* (2006.01)
*D06H 1/02* (2006.01)
*B41J 3/407* (2006.01)
*G09B 19/20* (2006.01)

(52) U.S. Cl.
CPC ............. *B41J 29/393* (2013.01); *B41F 17/38* (2013.01); *B41J 3/4078* (2013.01); *D06H 1/02* (2013.01); *G05B 15/02* (2013.01); *G09B 19/20* (2013.01)

(58) Field of Classification Search
CPC ............ G06T 11/00; B41F 17/38; B26D 5/00
See application file for complete search history.

(56) References Cited

U.S. PATENT DOCUMENTS

2010/0174400 A1 * 7/2010 Lai ........................ G06T 11/00
700/134

FOREIGN PATENT DOCUMENTS

EP 950752 A1 * 10/1999

* cited by examiner

*Primary Examiner* — Lam S Nguyen
(74) *Attorney, Agent, or Firm* — CRGO Global; Steven M. Greenberg

(57) ABSTRACT

Embodiments of the present invention provide a method, system and computer program product for templated pattern-based self-directed garment assembly. In an embodiment of the invention, a self-directed garment assembly method includes loading into memory a template of patterns forming a garment and retrieving from memory, at least one data record specifying at least one assembly instruction for assembling the garment from the patterns of the template. Thereafter, the assembly instruction may be embedded in the template adjacent to at least one of the patterns. Finally, the template is printed on a large format printer with the at least one assembly instructions onto fabric selected as a basis for the garment.

3 Claims, 2 Drawing Sheets

TEMPLATE EMBEDDED ASSEMBLY INSTRUCTIONS IN GARMENT ASSEMBLY

BACKGROUND OF THE INVENTION

Field of the Invention

The present invention relates to computer aided fabrication of garments and more particularly to garment assembly from computer generated templates patterns.

Description of the Related Art

In sewing and fashion design, a pattern is the template with which the parts of a garment are produced by placing the template upon fabric, tracing the perimeter of the template onto the fabric, cutting the traced portions of the fabric and assembling the cut portions of fabric into a garment. Patterns typically are formed from paper, and sometimes more rigid materials such as paperboard or cardboard so as to support repeated use. The process of making or cutting patterns is known as "patternmaking" and traditionally performed by a patternmaker who typically employs one of two methods to create a pattern. The first method is known as the flat-pattern method in which the entire pattern is drafted on a flat surface from measurements, using rulers, curves and straight-edges. The second method is known as drawing which involves creating a muslin mock-up pattern by pinning fabric directly on a form, and subsequently transferring the muslin outline and markings onto a paper pattern or using the muslin as the pattern itself.

The advent of computing has revolutionized patternmaking. Today, different computer applications facilitate the job of creating patterns by allowing the pattern maker to provide as data input to the application different measurements from which a pattern is generated computationally within a data processing system. Most applications additionally allow the pattern maker to fit individual measurements specifically, eliminating much fitting trial and error previously common in the sewing room. Indeed, the computational power of computing greatly eases the way in which garments are designed so as to more readily support not only mass-produced articles of clothing, but also custom, individually tailored garments known as "bespoke" articles.

Pattern utilization obviously lends itself well to the mass production of garments such that a discrete number of patterns are able to support the production of a wide range of different sizes of the same article of clothing. But, pattern utilization also works well in made-to-measure and bespoke garment fabrication. For made-to-measure garment fabrication, the pre-existing pattern is used to cut the relevant fabric which is then adjusted for the specific size of the customer, whereas in bespoke garment fabrication, a completely new pattern is created according to the measurements of the customer. In the latter circumstance, creating the pattern can be a manually intensive and thus time-consuming process.

To assist in the process of pattern making for bespoke manufacturing, three-dimensional imaging now integrates with computer automated pattern generation. Specifically, it is known today to acquire the measurements of an individual through the use of three-dimensional body scanning. Typically, three-dimensional body scanning is performed utilizing laser imaging in order to produce a computer representation of a scanned human form. Utilizing the scanned human form, a garment surface is defined in relationship to the dimensions of the human form reflected within the computer representation. Once the garment surface has been defined, it is a matter of computational mapping to generate a two-dimensional pattern for printing onto a paper medium using a conventional large format printer.

Of note, the process of fabricating a garment does not end with the printing of a template. Rather, an assembly must follow in which individuals manually cut portions of the template while stitching other portions together. The instructions directing the assemblers thus must be provided in paper form from which the assemblers then must memorize the process for use during assembly of garments. As can be seen, the foregoing process is ripe for error as different printed templates for different garments are processed by the same assemblers each day.

BRIEF SUMMARY OF THE INVENTION

Embodiments of the present invention address deficiencies of the art in respect to garment fabrication and provide a novel and non-obvious method, system and computer program product for self-directed garment assembly. In an embodiment of the invention, a self-directed garment assembly method includes loading into memory a template of patterns forming a garment and retrieving from memory, at least one data record specifying at least one assembly instruction for assembling the garment from the patterns of the template. Thereafter, the assembly instruction may be embedded in the template adjacent to at least one of the patterns. Finally, the template is printed on a large format printer with the at least one assembly instructions onto fabric selected as a basis for the garment.

In one aspect of the embodiment, the assembly instruction is a line demarcating a location for cutting. In another aspect of the embodiment, the assembly instruction is a line indicating a location for sewing. In yet another aspect of the embodiment, the assembly instruction further includes a textual instruction corresponding to the line. Finally, in even yet another aspect of the embodiment, the assembly instruction is a list of ordered steps of cutting and sewing.

In another embodiment of the invention, a garment assembly data processing system is provided. The system includes a host computing system that has at least one computer with memory and at least one processor. The system also includes a large format pattern printer coupled to the host computing system. Finally, the system includes a self-directed garment assembly module. The module includes computer program instructions enabled upon execution in the memory of the host computing system to load into the memory a template of patterns forming a garment and to retrieve from the memory, at least one data record specifying at least one assembly instruction for assembling the garment from the patterns of the template. The program instructions further are enabled to embed the assembly instruction adjacent to at least one of the patterns of the template. Finally, the program instructions are enabled to print the template with the at least one assembly instructions onto fabric selected as a basis for the garment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for self-directed garment assembly for templated pattern based garment assembly. In an embodiment of the invention, a templated pattern for a garment is loaded into memory of a computer and one or more corresponding instructions also retrieved from memory in association with the loaded templated pattern. A location on the templated pattern is then selected and the corresponding instructions are inserted into the located portion. For instance, the corresponding instructions may be a line along which a cut is to be made or along which a different portion of the templated pattern is to be sewn thereto, and the location may be the portion of the templated pattern at which the cut is to be made or along which the different portion of the templated pattern is to be sewn thereto. Finally, the templated pattern including the instructions are transmitted to a large format printer for printing.

Figure 1:
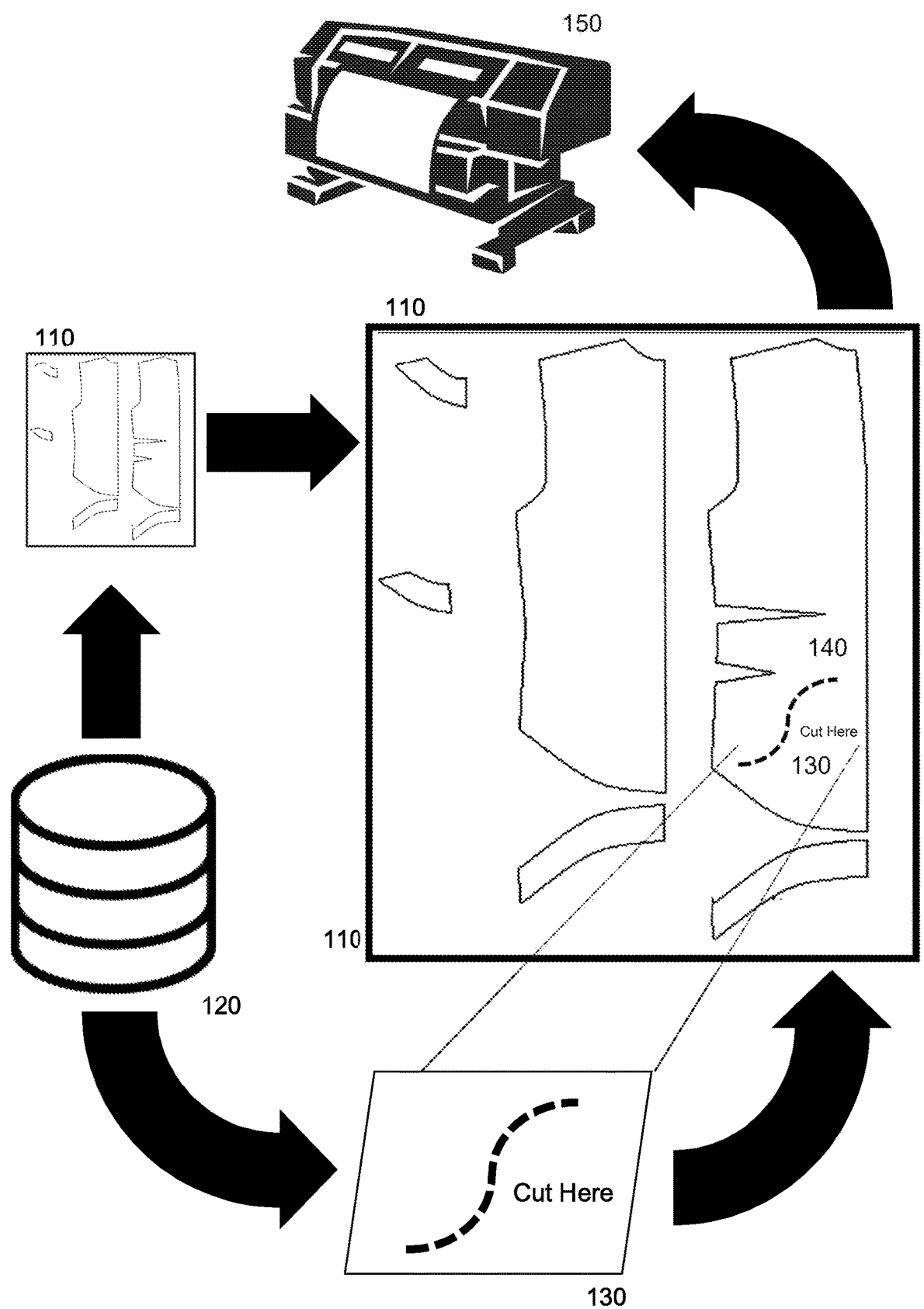
FIG. 1 is pictorial illustration of a process for self-directed garment assembly in templated pattern garment assembly.

In further illustration, FIG. 1 is pictorial illustration of a process for self-directed garment assembly in templated pattern garment assembly. As shown in FIG. 1, a template of patterns 110 is retrieved from data storage 120. As well, one or more assembly instructions 130 are also retrieved from the data storage 120 in connection with the assembly of a garment from the template of patterns 110. In this regard the assembly instructions 130 include a graphical indication of a location on the template of patterns 110 at which an assembly step is to occur such as a cutting or a sewing. Thereafter, a location on the template of patterns 110 is selected in connection with the assembly instructions 130 and the assembly instructions 130 are then inserted at the location in the template of patterns 110. Finally, the template of patterns 110 is printed on large format printer 150.

Figure 2:
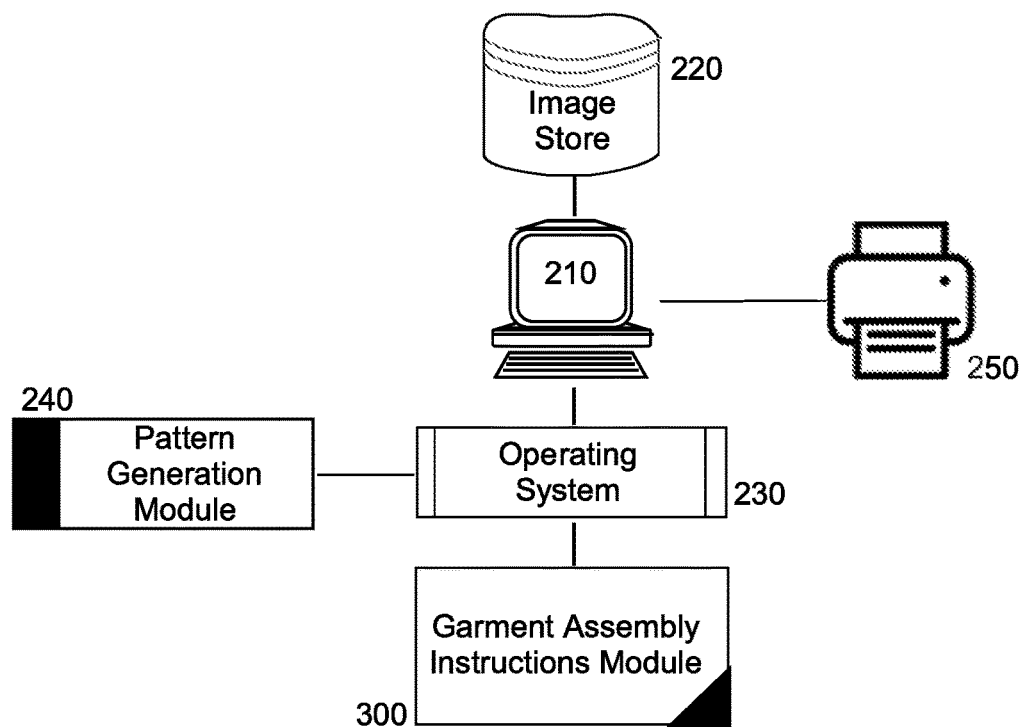
FIG. 2 is a schematic illustration of a templated pattern garment assembly data processing system configured for self-directed garment assembly; and, FIG. 3 is a flow chart illustrating a process for self-directed garment assembly in templated pattern garment assembly.

The process described in connection with FIG. 1 may be implemented in a templated pattern garment assembly system. In yet further illustration, FIG. 2 schematically shows a templated pattern garment assembly data processing system configured for self-directed garment assembly. The system includes a host computing platform 210 that includes one or more computers, each with memory and at least one processor. An operating system 230 executes in the memory of the host computing platform 210 and supports the operation of a pattern generation module 240. The pattern generation module 240 is enabled during execution in the memory of the host computing platform 210 to retrieve from image store 220 different patterns and generate a template for one of the patterns for printing onto large formal printer 250.

Of note, the system also includes a garment assembly instructions module 300. The garment assembly instructions module 300 includes computer program instructions that, upon execution in the memory of the host computing platform 210, are enabled to identify a garment for which a templated pattern has been loaded for printing. One or more assembly instructions for the identified garment are then retrieved and associated with a specific location within the templated pattern. As such, the computer program instructions are enabled to insert the assembly instructions at the associated specific location and the computer program instructions direct the printing of the templated pattern on the large format printer 250.

Figure 3:
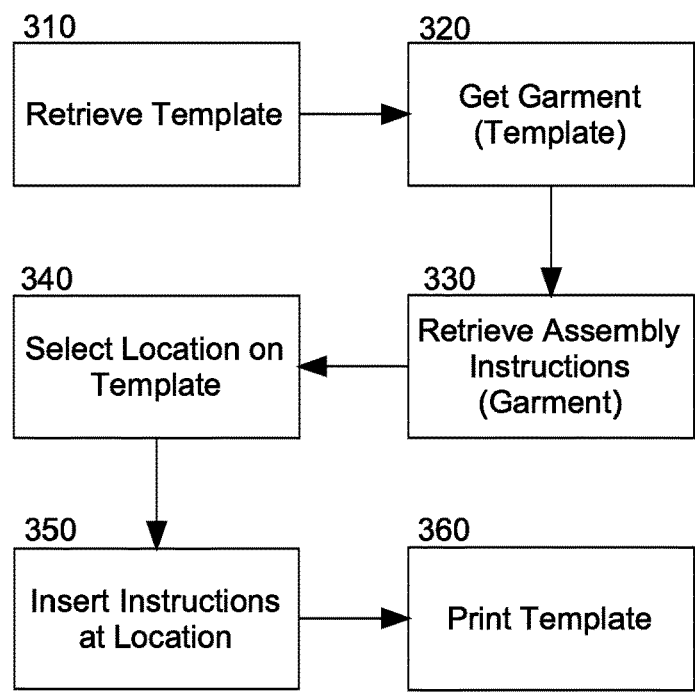

In even yet further illustration of the operation of the garment assembly instructions module 300, FIG. 3 is a flow chart illustrating a process for self-directed garment assembly in templated pattern garment assembly. Beginning in block 310, a template of patterns is loaded for use in assembling a garment. Then, in block 320 the garment for the template of patterns is identified and in block 330, different assembly instructions are retrieved from data storage in connection with the identified garment. In block 340, a location on the template of patterns is selected in consideration of the assembly instructions. Finally, at block 350, the assembly instructions are inserted at the selected location and in block 360, the template of patterns is sent to the large format printer for printing.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A self-directed garment assembly method comprising:
    loading into memory a template of patterns forming a garment;
    retrieving from memory, at least one data record specifying at least one assembly instruction for assembling the garment from the patterns of the template, the assembly instruction comprising both a line for demarcating a location for one of cutting and sewing, and also a textual instruction corresponding to the line, the textual instruction including a list of ordered steps of cutting and sewing;
    embedding the at least one assembly instruction adjacent to at least one of the patterns of the template; and,
    printing the template with the at least one assembly instructions onto fabric selected as a basis for the garment.

2. A garment assembly data processing system configured for self-directed garment assembly comprising:
    a host computing system comprising at least one computer with memory and at least one processor;
    a large format pattern printer coupled to the host computing system; and,
    a garment assembly module comprising computer program instructions enabled upon execution in the memory of the host computing system to perform:
    loading into the memory a template of patterns forming a garment;
    retrieving from the memory, at least one data record specifying at least one assembly instruction for assembling the garment from the patterns of the template, the assembly instruction comprising both a line for demarcating a location for one of cutting and sewing, and also a textual instruction corresponding to the line, the textual instruction including a list of ordered steps of cutting and sewing;
    embedding the at least one assembly instruction adjacent to at least one of the patterns of the template; and,
    printing the template with the at least one assembly instructions onto fabric selected as a basis for the garment.

3. A computer program product for self-directed garment assembly, the computer program product including a computer readable storage medium having program instructions embodied therewith, the program instructions executable by a device to cause the device to perform a method including:
    loading into memory a template of patterns forming a garment;
    retrieving from memory, at least one data record specifying at least one assembly instruction for assembling the garment from the patterns of the template, the assembly instruction comprising both a line for demarcating a location for one of cutting and sewing, and also a textual instruction corresponding to the line, the textual instruction including a list of ordered steps of cutting and sewing;
    embedding the at least one assembly instruction adjacent to at least one of the patterns of the template; and, printing the template with the at least one assembly instructions onto fabric selected as a basis for the garment.

<p style="text-align:center">* * * * *</p>